US010467841B2

(12) United States Patent
Matsumoto

(10) Patent No.: US 10,467,841 B2
(45) Date of Patent: Nov. 5, 2019

(54) SHEET HANDLING APPARATUS, SHEET HANDLING SYSTEM AND SHEET HANDLING METHOD

(71) Applicant: GLORY LTD., Hyogo (JP)

(72) Inventor: Yasuhiro Matsumoto, Hyogo (JP)

(73) Assignee: GLORY LTD., Hyogo (JP)

( * ) Notice: Subject to any disclaimer, the term of this patent is extended or adjusted under 35 U.S.C. 154(b) by 0 days.

(21) Appl. No.: 16/078,414

(22) PCT Filed: Feb. 22, 2017

(86) PCT No.: PCT/JP2017/006511
§ 371 (c)(1),
(2) Date: Aug. 21, 2018

(87) PCT Pub. No.: WO2017/146079
PCT Pub. Date: Aug. 31, 2017

(65) Prior Publication Data
US 2019/0035196 A1 Jan. 31, 2019

(30) Foreign Application Priority Data
Feb. 22, 2016 (JP) ................................ 2016-031008

(51) Int. Cl.
*G06K 9/74* (2006.01)
*G07D 7/202* (2016.01)
(Continued)

(52) U.S. Cl.
CPC ............... *G07D 7/205* (2013.01); *G07D 3/00* (2013.01); *G07D 7/004* (2013.01); *G07D 7/0032* (2017.05);
(Continued)

(58) Field of Classification Search
CPC .... G07D 7/205; G07D 7/0032; G07D 7/0034; G07D 7/1205; G07D 11/28; G07D 11/14; G07D 3/00; G07D 7/004; G07D 9/00
(Continued)

(56) References Cited

U.S. PATENT DOCUMENTS 6,529,269 B1 * 3/2003 Sugata ................ G07D 7/1205 356/71
2001/0004286 A1 * 6/2001 Furuya ................ G07D 7/1205 356/71
(Continued)

FOREIGN PATENT DOCUMENTS

JP 10-340368 12/1998
JP 2003-162753 6/2003
(Continued)

OTHER PUBLICATIONS

Official Communication issued in International Patent Application No. PCT/JP2017/006511, dated May 30, 2017, along with English translation.

*Primary Examiner* — Roy M Punnoose
(74) *Attorney, Agent, or Firm* — Greenblum & Bernstein, P.L.C.

(57) ABSTRACT

Proceeds deposit machine has determination setting data containing correspondence between types of the coupons and information relating to necessity of authentication determination. A type determination unit determines the type of deposited coupon and then refers to the determination setting data. If "yes" has been set for the necessity of the authentication determination for the determined type of coupon, an authentication determination unit performs authentication determination. If the coupon is determined to be counterfeit as result of the authentication determination, the proceeds deposit machine discharges this coupon. If the coupon is determined to be genuine, proceeds deposit
(Continued)

machine stores this coupon in one of sheet cassettes. If "no" has been set for the necessity of the authentication determination for the determined type of the coupon, proceeds deposit machine stores this coupon in one of the sheet cassettes without performing the authentication determination by the authentication determination unit.

9 Claims, 11 Drawing Sheets

(51) Int. Cl.

| | |
|---|---|
| ***G07D 3/00*** | (2006.01) |
| ***G07D 9/00*** | (2006.01) |
| ***G07D 7/00*** | (2016.01) |
| ***G07D 7/1205*** | (2016.01) |
| ***G07D 11/28*** | (2019.01) |
| ***G07D 11/14*** | (2019.01) |
| ***G07D 7/004*** | (2016.01) |

(52) U.S. Cl.
CPC ......... *G07D 7/0034* (2017.05); *G07D 7/1205* (2017.05); *G07D 9/00* (2013.01); *G07D 11/14* (2019.01); *G07D 11/28* (2019.01); *G07D 2207/00* (2013.01); *G07D 2211/00* (2013.01)

(58) Field of Classification Search
USPC ........................................................... 356/71
See application file for complete search history.

(56) References Cited

U.S. PATENT DOCUMENTS

| | | | | |
|---|---|---|---|---|
| 2002/0153412 | A1 | 10/2002 | Numata et al. | |
| 2007/0165208 | A1* | 7/2007 | Cowburn ............. | G03G 21/046 356/71 |
| 2009/0008924 | A1* | 1/2009 | Ophey ................. | G06K 19/086 283/85 |
| 2015/0221159 | A1 | 8/2015 | Moribayashi et al. | |
| 2019/0035198 | A1* | 1/2019 | Nakashima .............. | G07D 9/00 |

FOREIGN PATENT DOCUMENTS

| | | |
|---|---|---|
| JP | 2004-199110 | 7/2004 |
| JP | 2009-211500 | 9/2009 |
| JP | 2014-56472 | 3/2014 |
| JP | 2014-78089 | 5/2014 |
| WO | 2014/013585 | 1/2014 |

* cited by examiner

FIG.5A

90a

| | | |
|---|---|---|
| NUMBER OF BANKNOTES | JPY 10,000 NOTE | 230 |
| | JPY 5,000 NOTE | 20 |
| | JPY 1,000 NOTE | 40 |
| NUMBER OF COINS | JPY 500 COIN | 10 |
| | JPY 100 COIN | 35 |
| | JPY 50 COIN | 20 |
| | JPY 10 COIN | 60 |
| | JPY 5 COIN | 15 |
| | JPY 1 COIN | 40 |
| NUMBER OF COUPONS | A0001 | 20 |
| | : | : |
| | B0001 | 8 |
| | : | : |

FIG.5B

90b

| TYPE OF COUPON | FACE VALUE | IMAGE DATA |
|---|---|---|
| A001 | 1000 | a001true.bmp |
| : | : | : |
| B001 | 500 | b001true.bmp |
| : | : | : |

FIG. 6A

90c

| TYPE OF COUPON | TYPE OF PAYMENT REQUEST | NECESSITY OF AUTHENTICATION DETERMINATION |
|---|---|---|
| A001 | DATA REQUEST | YES |
| : | : | : |
| B001 | PHYSICAL REQUEST | NO |
| | : | : |

FIG. 6B

90d

| TYPE OF COUPON | GENUINE COUPON DATA |
|---|---|
| A001 | Pattern-a001 |
| : | : |

SHEET HANDLING APPARATUS, SHEET HANDLING SYSTEM AND SHEET HANDLING METHOD

TECHNICAL FIELD

The present invention relates to a sheet handling apparatus, a sheet handling system, and a sheet handling method for accepting a deposit of a plurality of types of sheets.

BACKGROUND ART

Generally, a proceeds deposit machine, which is one of money handling apparatuses, is installed in a shop of commercial facilities such as a supermarket and a department store. The proceeds deposit machine is used for depositing therein money, which is proceeds from sales, stored in each of the checkout counters in the commercial facility. A conventional proceeds deposit machine that stores not only money but also coupons as the proceeds from sales is known in the art. For example, a technique that achieves space-saving by one device capable of transporting and storing money and coupons is disclosed in Patent Document 1.

The coupons are roughly classified into a coupon, of which the issuance source requires that the coupon is physically sent to the issuance source, such as a beer coupon and a book coupon (hereinafter referred to as "physical coupon"), and the other coupon, of which the issuance source requires that data relating to the coupon is transmitted to the issuance source, such as a coupon issued by a credit card company (hereinafter referred to as "data coupon"). The coupons are stored in a storing unit of a proceeds deposit machine without being determined authentication thereof. The reason is that more than 5000 types of the coupons are available and it is not realistic to perform the authentication determination for all the types of the coupons by the proceeds deposit machine.

CITATION LIST

Patent Document

[Patent Document 1] Japanese Patent Application Laid-Open No. 2014-78089

SUMMARY OF INVENTION

Technical Problem

However, like in Patent Document 1, if the authentication determination of the coupon is not performed in the proceeds deposit machine, it takes a long time to notice the existence of a coupon counterfeited by a malicious third party (hereinafter referred to as "counterfeit coupon") and it causes various issues.

Specifically, the issuance source of the data coupon determines whether a data coupon is a counterfeit coupon or not based on data transmitted to the issuance source. It takes a long time to determine as the counterfeit coupon. Accordingly, it takes a long time for the shop to notice the existence of the counterfeit coupon. Therefore, it causes a delay of the countermeasures against the counterfeit coupon and it is possible that other counterfeit coupons are used in the store before the shop notices the existence of the counterfeit coupon.

In addition, if the store notices the existence of the counterfeit coupon after the shop reported the proceeds from sales to the headquarters, it is not possible for the shop to perform impairment processing relating to this counterfeit coupon before the report and it causes an unnecessary burden on a salesclerk of the shop.

Accordingly, how to efficiently perform the authentication determination of coupons in the proceeds deposit machine is an important issue. Such issue arises not only for the coupons but also for all the sheets including the money.

The present invention has been made in view of the above discussion. It is one object of the present invention to provide a sheet handling apparatus, a sheet handling system, and a sheet handling method capable of efficiently performing authentication determination of a sheet.

Means for Solving Problems

To solve the above problems and achieve the above object, a sheet handling apparatus according to one aspect of the present invention includes an inlet configured to deposit a sheet; a setting unit configured to set whether a sheet is to be a target of determination including at least authentication determination; and a determination unit configured to perform at least the authentication determination of the sheet, which has been set by the setting unit as the target of the determination, among the sheets deposited in the inlet.

The above sheet handling apparatus further includes an image capturing unit configured to capture the sheet; and a transmission processing unit configured to transmit image data of the sheet of a predetermined type, which is captured by the image capturing unit among the sheets deposited in the inlet, to a predetermined management apparatus corresponding to the sheet. The setting unit is configured to set the sheet of the predetermined type, of which the image data is transmitted to the management apparatus, as the target of the determination, and set the sheet of a type other than the predetermined type not as the target of the determination.

The above sheet handling apparatus further includes a memory configured to store therein, as registration data, the image data of an official sheet set as the target of the determination by the setting unit, or data relating to at least one of a watermark part, a fluorescent part, a hologram, a security thread part, and a microcharacter part included in the image data. The determination unit is configured to perform the authentication determination of the sheet set as the target of the determination by the setting unit based on the registration data stored in the memory, and the image data of the sheet of the predetermined type that has been captured by the image capturing unit, or at least one of the watermark part, the fluorescent part, the hologram, the security thread part, and the microcharacter part included in the image data.

In the above sheet handling apparatus, the transmission processing unit is configured to transmit to the predetermined management apparatus corresponding to the sheet determination result of the sheet obtained by the determination unit along with the image data of the sheet of the predetermined type.

In the above sheet handling apparatus, the sheet is a coupon that is used for payment for merchandise. The setting unit is configure d to set a coupon, of which data need to be transmitted to an issuance source, as the target of the determination, and set a coupon, for which the coupon needs to be physically sent to the issuance source, not as the target of the determination.

In the above sheet handling apparatus, the sheet is money. The setting unit is configured to set money issued by a first country as the target of the determination and set money issued by a second country not as the target of the determination.

A sheet handling system according to another aspect of the present invention is a sheet handling system in which a sheet handling apparatus and a predetermined management apparatus are connected to each other. The sheet handling apparatus includes an inserting unit configured to deposit a sheet; a setting unit configured to set whether the sheet is to be a target of determination including at least authentication determination; and a sheet data notifying unit configure d to notify the management apparatus of data relating to the sheet set as the target of the determination by the setting unit, among sheets deposited in the inlet. The management apparatus includes a determination unit configured to perform at least the authentication determination of the sheet based on the data relating to the sheet notified by the sheet handling apparatus; and a determination result notifying unit configured to notify the sheet handling apparatus of determination result obtained by the determination unit.

In the above sheet handling system, the management apparatus further includes a counterfeit information notifying unit configured to notify, when the determination unit determines that the sheet is counterfeit, the management apparatus of each shop of information relating to the sheet.

A sheet handling method according to still another aspect of the present invention is a sheet handling method implemented in a sheet handling apparatus that includes an inlet configured to deposit a sheet. The sheet handling method includes setting whether a sheet is to be a target of determination including at least authentication determination; and performing at least the authentication determination of the sheet set as the target of the determination at the setting, among the sheets deposited in the inserting unit.

Advantageous Effects of Invention

According to the present invention, authentication determination of the sheet can be performed efficiently.

BRIEF DESCRIPTION OF DRAWINGS

FIGS. 5A and 5B show an example of inventory amount data and coupon data shown in FIG. 4.

FIGS. 6A and 6B show an example of determination setting data and registration data shown in FIG. 4.

DESCRIPTION OF EMBODIMENTS

Exemplary embodiments of a sheet handling apparatus, a sheet handling system, and a sheet handling method according to the present invention are explained below in detail by referring to the accompanying drawings. Note that, in the present embodiment, an example in which the present invention is applied to a proceeds deposit machine; however, the present invention is not limited to this. The present invention can be applied to various sheet handling apparatuses capable of accepting a deposit of a plurality of types of sheets.

First Embodiment

Concept of Proceeds Deposit Machine

Figure 1:
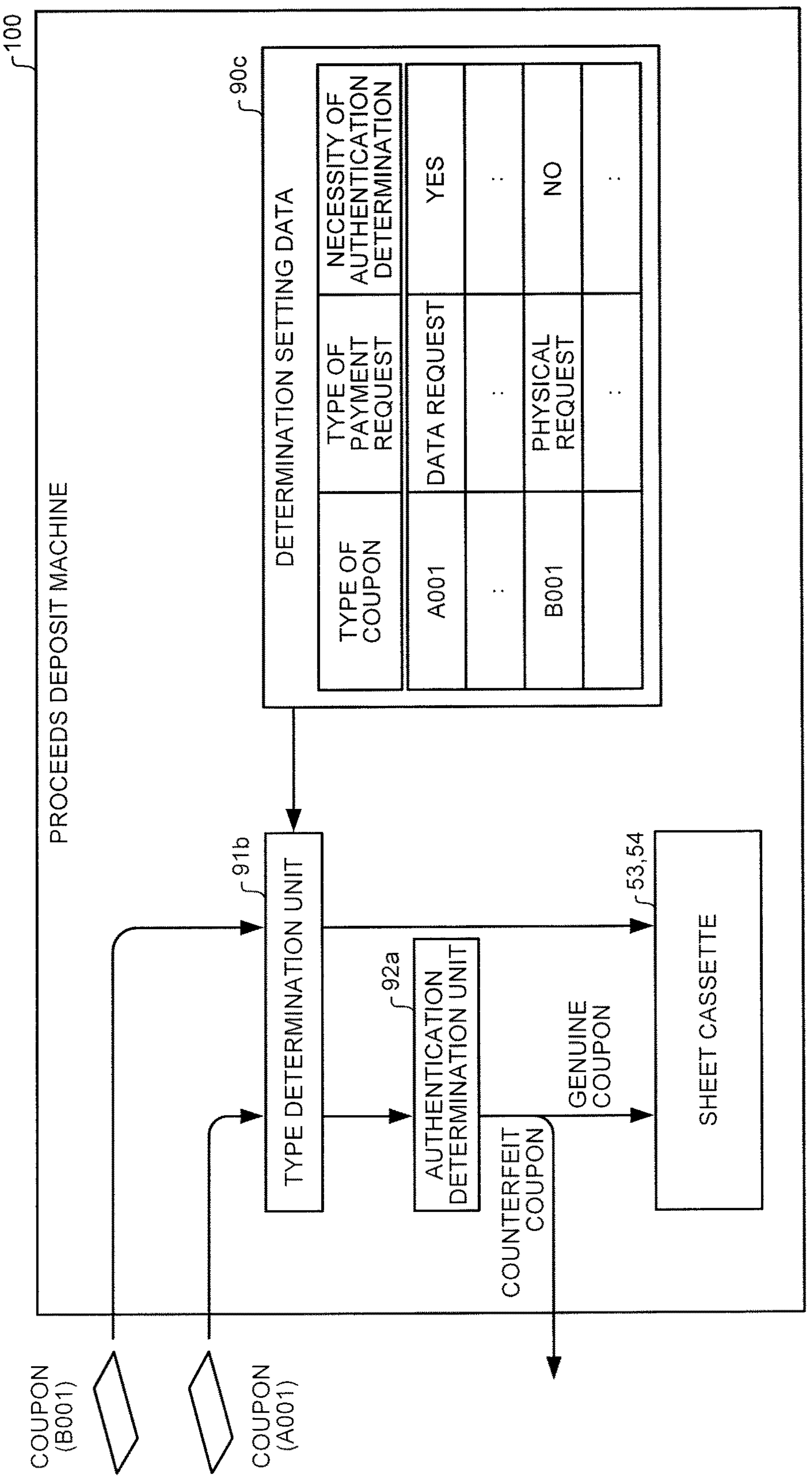
FIG. 1 is a view to explain the concept of a proceeds deposit machine according to a first embodiment.

First of all, the concept of a proceeds deposit machine according to a first embodiment is explained. FIG. 1 is a view to explain the concept of the proceeds deposit machine according to the first embodiment. A proceeds deposit machine 100 shown in FIG. 1 is installed in a back office of a shop. The proceeds deposit machine 100 is a device that receives proceeds from sales stored in a plurality of check-out counters arranged in the shop. Sheet cassettes 53 and 54 are arranged in the proceeds deposit machine 100 in a detachable manner. Banknotes deposited as the proceeds from sales are stored in the sheet cassette 53 or the sheet cassette 54. Similarly, coins deposited as the proceeds from sales are stored in coin cassettes which are not shown in the figure. The proceeds deposit machine 100 can accept a deposit of not only money but also coupons. The coupons can be stored in the sheet cassette 53 or the sheet cassette 54. At a predetermined time in a day, a collector of a cash-in-transit company or the shop removes the sheet cassettes 53 and 54 and the coin cassettes from the proceeds deposit machine 100 and delivers them to a cash center.

The proceeds deposit machine 100 determines a denomination and authenticity of the banknote and/or coin deposited therein and discharges therefrom the banknote and/or the coin which is determined as a counterfeit note and/or counterfeit coin. Accordingly, the shop can perform impairment processing on money paid by using the counterfeit notes and/or the counterfeit coins in the proceeds from sales.

On the other hand, when a coupon is deposited into the proceeds deposit machine 100, the proceeds deposit machine 100 determines whether the authentication determination is to be performed based on the types of the coupons. Because more than 5000 types of the coupons are available, and it is not realistic to perform the authentication determination for all the types of the coupons. Accordingly, the authentication determination is to be performed selectively on the types of the coupons of high importance, such as the types of the coupons that are circulated in large quantities. By doing so, the shop can performs the impairment processing on at least a part of types of the coupons.

Generally, the data coupons, for which payment requests of amounts corresponding to the face values are to be performed by transmitting data relating to the coupons to the issuance source, are circulated in larger quantities than the physical coupons, for which payment requests of amounts corresponding to the face values are to be performed by physically sending the coupons to the issuance source. Accordingly, in the present embodiment, as an example, the data coupons are processed as the target of the authentication determination, and the authentication determination is not performed for the physical coupons. Note that, necessity of the authentication determination can be set appropriately in the proceeds deposit machine 100. For example, it can be set that the authentication determination is not performed for a part or all of the data coupons. Also, it can be set that the authentication determination is performed for a part or all of the physical coupons.

Specifically, the proceeds deposit machine 100 shown in FIG. 1 has determination setting data 90*c* that contains correspondence between types of the coupons and information relating to the necessity of the authentication determination. The determination setting data 90*c* shows a coupon of a type "A001" for which "data request" is set for the type of the payment request and "yes" is set for the necessity of the authentication determination. With respect to a coupon of a type "B001", "physical request" is set for the type of the payment request and "no" is set for the necessity of the authentication determination.

The proceeds deposit machine 100 includes a type determination unit 91*b* and an authentication determination unit 92*a*. The type determination unit 91*b* determines the type of the deposited coupon and then refers to the determination setting data 90*c*. If "yes" has been set for the necessity of the authentication determination for the determined type of the coupon, the authentication determination unit 92*a* performs the authentication determination for this coupon. If the coupon is determined to be a counterfeit coupon as result of the authentication determination, the proceeds deposit machine 100 discharges this coupon. In contrast, if the coupon is determined to be a genuine coupon, the proceeds deposit machine 100 stores this coupon in one of the sheet cassettes 53 and 54. On the other hand, if "no" has been set for the necessity of the authentication determination for the determined type of the coupon, the proceeds deposit machine 100 stores this coupon in one of the sheet cassettes 53 and 54 without performing the authentication determination by the authentication determination unit 92*a*.

When the coupon of the type "A001" is deposited into the proceeds deposit machine 100, the authentication determination is performed for this coupon. This coupon is discharged if it is the counterfeit coupon, and stored in one of the sheet cassettes 53 and 54 if it is the genuine coupon. When the coupon of the type "B001" is deposited into the proceeds deposit machine 100, this coupon is stored in one of the sheet cassettes 53 and 54 without performing the authentication determination thereof.

The types of the coupons that are set as the target of the authentication determination and the types of the coupons that are not set as the target of the authentication determination has been set in the proceeds deposit machine 100. Among the deposited coupons, the authentication determination process is performed for the coupons that has been set as the target of the authentication determination. The authentication determination can be performed efficiently for coupons and therefore a counterfeit coupon can be noticed early, and countermeasures or the impairment processing can be performed.

External Appearance of Proceeds Deposit Machine

Figure 2:
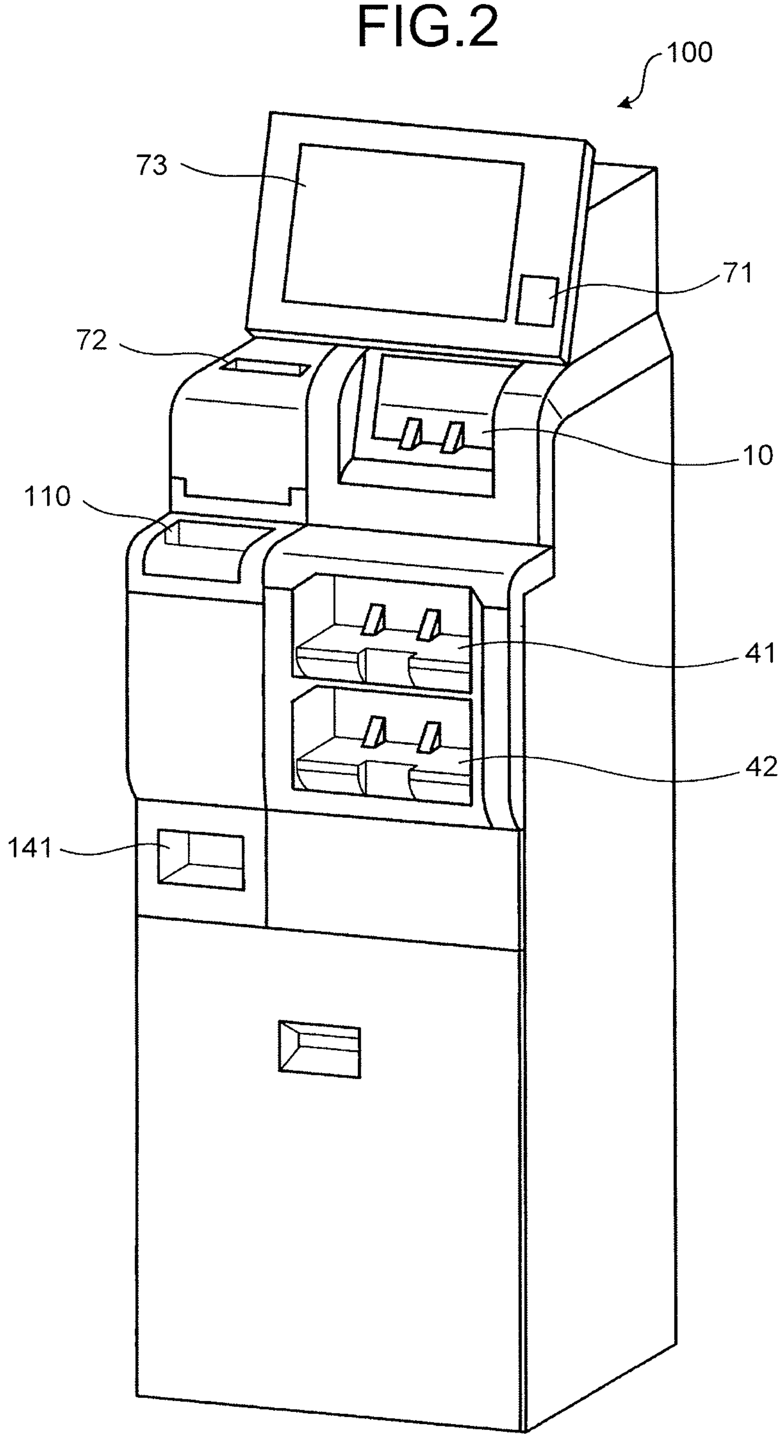
FIG. 2 is a perspective view of the proceeds deposit machine according to the first embodiment.

An external appearance of the proceeds deposit machine 100 according to the first embodiment is explained next. FIG. 2 is a perspective view of the proceeds deposit machine 100 according to the first embodiment. As shown in FIG. 2, the proceeds deposit machine 100 includes a display/operation unit 73, an IC card reader 71, a receipt printer 72, a coin inlet 110, a sheet inlet 10, a sheet reject unit 41, a sheet stacker 42, and a coin reject unit 141.

The display/operation unit 73 is arranged at the top of the proceeds deposit machine 100. The display/operation unit 73 is a touch-type display that displays screen on various processes and accepts input from a cashier and/or a collector in charge of each checkout counter. The IC card reader 71 is a card reader capable of reading data stored in an IC card, such as a cashier card, of the cashier and/or the collector. The receipt printer 72 is a printing unit of a thermal printing type that prints a receipt.

The coin inlet 110 is an inlet in which the cashier deposits a coin and the sheet inlet 10 is an inlet in which the cashier deposits a banknote or a coupon. The coins, and the banknotes and the coupons, which constitute the proceeds from sales brought by the cashier, are deposited into the coin inlet 110 and the sheet inlet 10, respectively.

The sheet reject unit 41 is a discharging unit to which, among the sheets deposited in the sheet inlet 10, a banknote whose denomination could not be recognized, a banknote determined to be a counterfeit note, and/or a coupon determined to be a counterfeit coupon are transported. The sheet stacker 42 is a stacker to which a banknote and/or a coupon that satisfies a predetermined condition set previously are transported. The coin reject unit 141 is a discharging unit in which, among the coins deposited in the coin inlet 110, a coin whose denomination could not be recognized and/or a coin determined to be a counterfeit coin are discharged.

Operation of Depositing Proceeds from Sales in Proceeds Deposit Machine

An operation performed when depositing proceeds from sales in the proceeds deposit machine 100 is explained next. An example in which a cashier deposits in the proceeds deposit machine 100 the proceeds from sales stored in a change machine arranged at a checkout counter is explained here; however, a salesclerk other than the cashier can deposit the proceeds from sales in the proceeds deposit machine 100.

First, the cashier holds the cashier card (IC card) over the IC card reader 71 of the proceeds deposit machine 100. The IC card reader 71 reads identification information of the cashier stored in the cashier card and identifies a checkout counter number from the identification information. Note that, the cashier can directly input the checkout counter number by using the display/operation unit 73.

Then, the cashier deposits into the sheet inlet 10 the banknotes collected from the change machine, deposits into the coin inlet 110 the coins collected from the change machine, and performs an instruction operation, by using the display/operation unit 73, to perform money deposit process. Upon receiving the instruction operation to perform the money deposit process, the proceeds deposit machine 100 feeds the banknotes deposited in the sheet inlet 10, recognizes the authentication and the denomination of each banknote, and counts the number of the banknotes, which are recognized as genuine notes, by denomination. Moreover, the proceeds deposit machine 100 feeds the coins deposited in the coin inlet 110, recognizes the authentication and the denomination of each coin, and counts the number of the coins, which are recognized as genuine coins, by denomination.

When depositing the coupons, the cashier deposits the coupons collected from the change machine into the sheet inlet 10 and performs an instruction operation, by using the display/operation unit 73, to perform coupon deposit process. Upon receiving the instruction operation to perform the coupon deposit process, the proceeds deposit machine 100 feeds the coupons deposited in the sheet inlet 10, recognizes the type of each coupon, recognizes the authentication of each coupons if required for a recognized type, and counts the face value and the number of the coupons other than the counterfeit coupons.

After completing the counting process of the banknotes, the coins and the coupons, the proceeds deposit machine 100 displays the result of the counting process on the display/ operation unit 73. Upon receiving an operation (approval operation) to perform the deposit process based on the displayed contents, the proceeds deposit machine 100 stores the counted banknotes and the counted coupons in the sheet cassette, and stores the counted coins in the coin cassette.

The deposit data is registered in deposit history data which is not shown in the figure. Moreover, the proceeds deposit machine 100 issues a receipt (deposit result statement). The receipt includes authentication information including a checkout counter number of a collection source and the cashier, and the deposit data.

In this manner, the proceeds deposit machine 100 identifies the checkout counter number of the collection source from the cashier card, receives the money and the coupons, recognizes and counts the received money and the coupons, registers the checkout counter number and the deposit data in the deposit history data, and issues a receipt including this information.

Internal Configuration and Operation of Proceeds Deposit Machine

Figure 3:
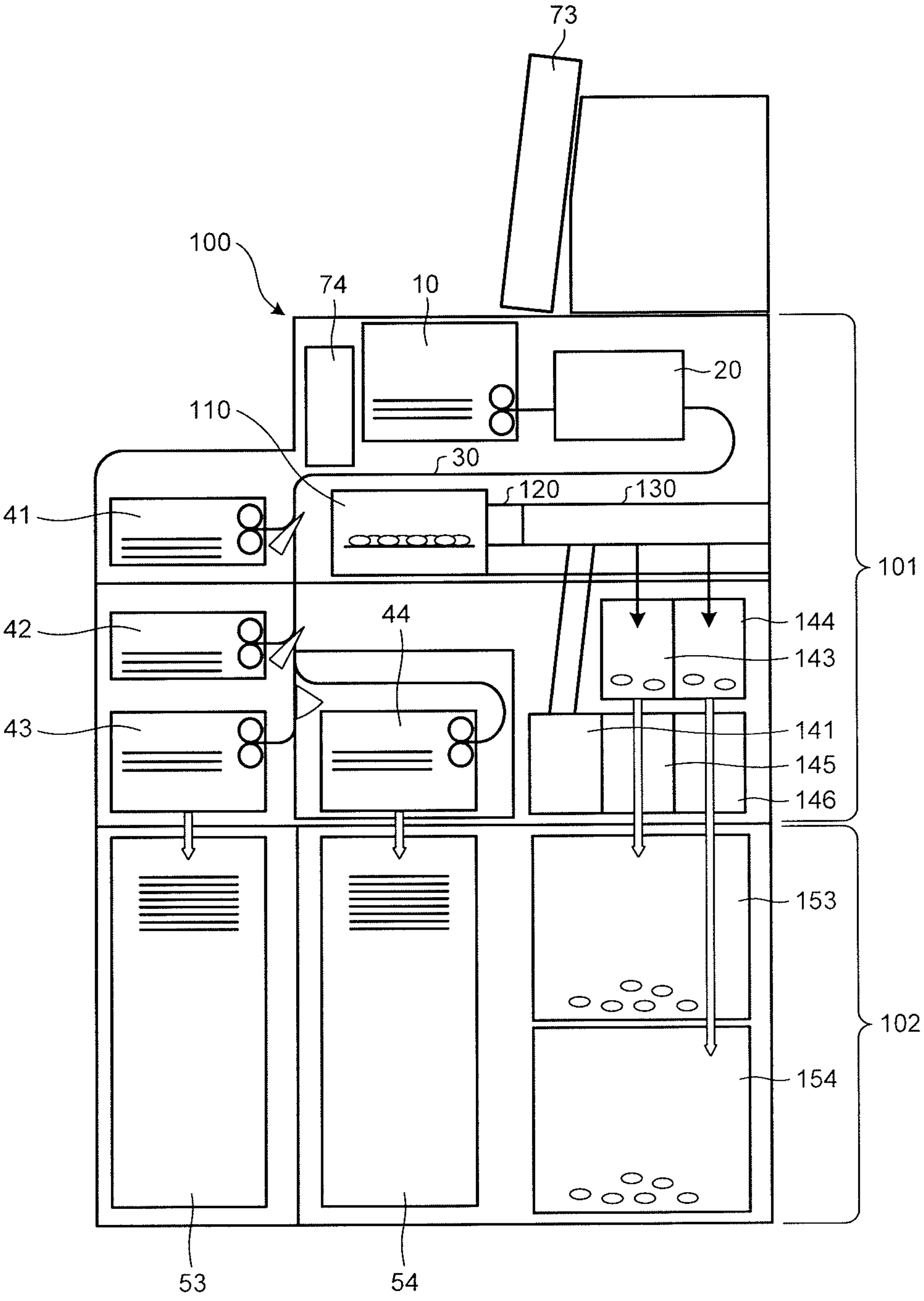
FIG. 3 is a view of an internal configuration of the proceeds deposit machine shown in FIG. 2.

An internal configuration and an operation of the proceeds deposit machine 100 shown in FIG. 2 is explained next. FIG. 3 is a view of an internal configuration of the proceeds deposit machine 100 shown in FIG. 2.

First, parts relating to a deposit process of a sheet will be explained. The sheet deposited in the sheet inlet 10 is transported by a sheet transport unit 30 to a sheet recognition unit 20. The recognition unit 20 performs recognition of the denomination of a banknote when the sheet is a banknote and performs determination of the type of a coupon when the sheet is a coupon. The sheet recognition unit 20 includes an image scanner that acquires an image of the sheet being transported. The sheet that has been recognized by the sheet recognition unit 20 is transported by the sheet transport unit 30 to one of the sheet reject unit 41, the sheet stacker 42, a sheet temporary storage unit 43, and a sheet temporary storage unit 44. A negation unit 74 is arranged in the sheet transport unit 30 between the sheet recognition unit 20 and the sheet reject unit 41. The negation unit 74 is a printer that prints nullification information indicating that the coupon is a used coupon that has been used.

A banknote whose denomination could not be recognized by the sheet recognition unit 20 and/or a coupon that is determined to be the counterfeit coupon by the sheet recognition unit 20 are transported to the sheet reject unit 41. A banknote whose denomination is recognized and/or a coupon that is determined not to be the counterfeit coupon by the sheet recognition unit 20 are transported to the sheet temporary storage units 43 and 44.

The sheet cassettes 53 and 54 are arranged below the sheet temporary storage units 43 and 44, respectively. A sheet being temporarily stored in the sheet temporary storage unit 43 is stored in the sheet cassette 53, and a sheet being temporarily stored in the sheet temporary storage unit 44 is stored in the sheet cassette 54. By pulling out an temporary storage section including the sheet temporary storage units 43 and 44 toward a device front side, the sheets being temporarily stored in the sheet temporary storage units 43 and 44 can be taken out of the sheet temporary storage units 43 and 44.

Parts relating to a deposit process of a coin will be explained next. A coin deposited in the coin inlet 110 is transported to a coin recognition unit 120. The coin recognition unit 120 recognizes a denomination of the coin fed from the coin inlet 110. The coin recognized by the coin recognition unit 120 is transported by a coin transport unit 130 including three sorting mechanisms to one among the coin reject unit 141 and coin temporary storage units 143 and 144.

A coin whose denomination could not be recognized by the coin recognition unit 120 is transported to the coin reject unit 141. A coin whose denomination is recognized by the coin recognition unit 120 is sorted to one of the coin temporary storage units 143 and 144.

Coin return boxes 145 and 146, in which a coin is returned when receiving an instruction to return the coin that has been transported to the coin temporary storage units 143 and 144, are arranged below the coin temporary storage units 143 and 144, respectively. In a state in which the coin has been counted and temporarily stored in one of the coin temporary storage units 143 and 144, if an operation that instructing the return of the coin is received, the coin stored in the coin temporary storage unit 143 or 144 is moved to the coin return box 145 or 146. Coin cassettes 153 and 154 are arranged further below the coin return boxes 145 and 146. Upon receiving a storage instruction, the coins that have been transported to the coin temporary storage units 143 and 144 are stored in the coin cassettes 153 and 154. The coin temporarily stored in the coin temporary storage unit 143 is then stored in the coin cassette 153, and the coin temporarily stored in the coin temporary storage unit 144 is then stored in the coin cassette 154. By pulling out a coin temporary storage section including the coin return boxes 145 and 146 toward the device front side, the coins being temporarily stored in the coin return boxes 145 and 146 can be taken out of the coin return boxes 145 and 146.

The proceeds deposit machine 100 includes an upper unit 101 and a lower unit 102. When a predetermined operation is performed by the collector having authority for collecting the money stored in the proceeds deposit machine 100, an electromagnetic lock is released, and the lower unit 102 including the sheet cassettes 53 and 54 and the coin cassettes 153 and 154 can be pulled out. By pulling out the lower unit 102, the sheet cassettes 53 and 54 and the coin cassettes 153 and 154 can be removed. The collector of the cash-in-transit company or the shop can pull out the lower unit 102, remove the sheet cassettes 53 and 54 and the coin cassettes 153 and 154 from the lower unit 102, and carry those removed cassettes to the cash center.

Internal Functional Configuration of Proceeds Deposit Machine

Figure 4:
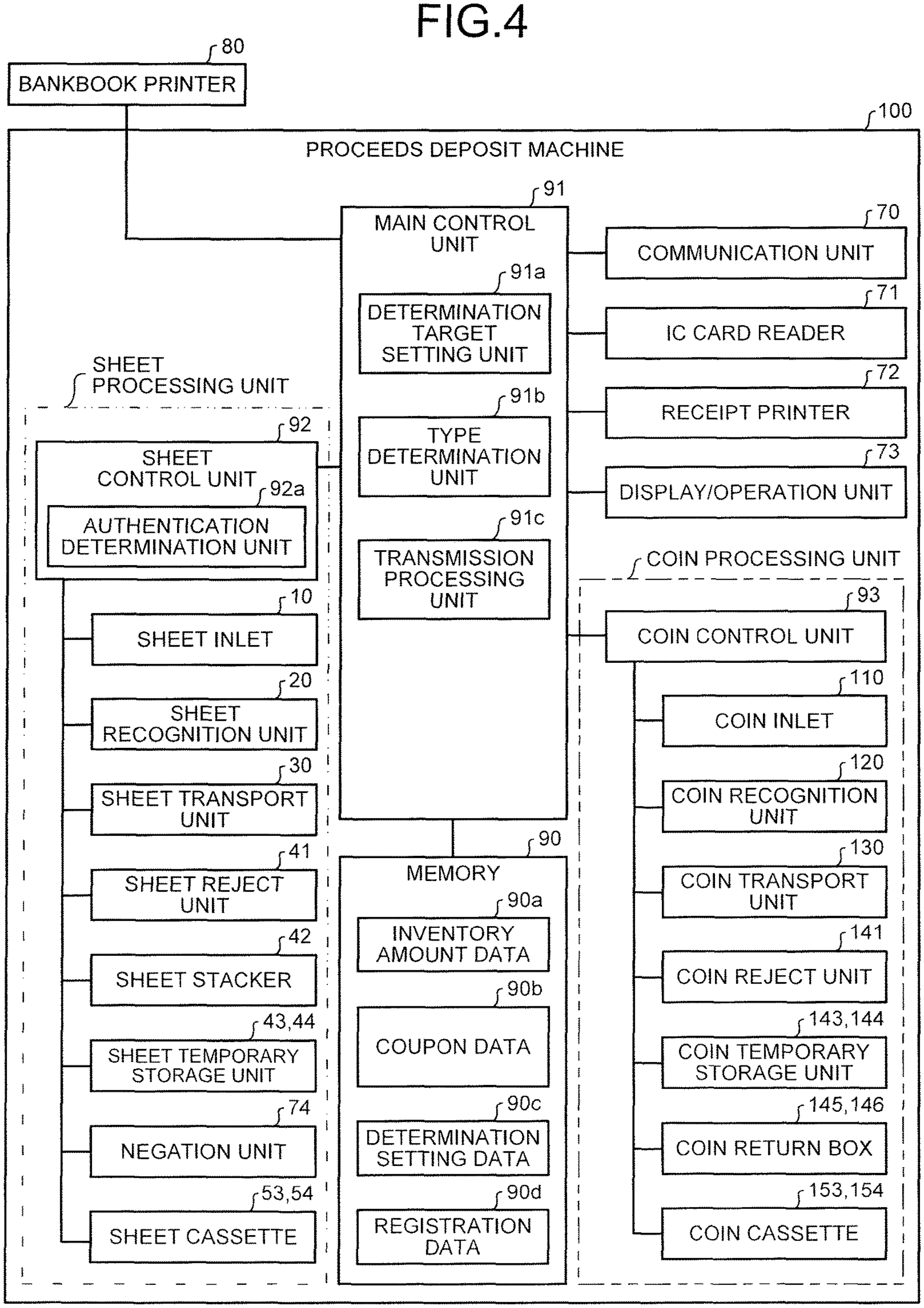
FIG. 4 is a functional block diagram of the proceeds deposit machine.

An internal functional configuration of the proceeds deposit machine 100 shown in FIG. 2 is explained next. FIG. 4 is a functional block diagram of the proceeds deposit machine 100. A bankbook printer 80 can be connected to the proceeds deposit machine 100 as an optional apparatus. The bankbook printer 80 is an output device that outputs to a recording medium of a bankbook type a history of deposit of the proceeds from sales deposited into the proceeds deposit machine 100.

The proceeds deposit machine 100 includes a communication unit 70, the IC card reader 71, the receipt printer 72, the display/operation unit 73, a memory 90, a main control unit 91, a sheet processing unit, and a coin processing unit. The sheet processing unit is a unit that processes the sheets. The sheet processing unit includes a sheet control unit 92, the sheet inlet 10, the sheet recognition unit 20, the sheet transport unit 30, the sheet reject unit 41, the sheet stacker 42, the sheet temporary storage units 43 and 44, the negation unit 74, and the sheet cassettes 53 and 54. The coin processing unit is a unit that processes the coins. The coin processing unit includes a coin control unit 93, the coin inlet 110, the coin recognition unit 120, the coin transport unit

130, the coin reject unit 141, the coin temporary storage units 143 and 144, the coin return boxes 145 and 146, and the coin cassettes 153 and 154. An explanation will be given centering on the parts that have not been shown in FIG. 3.

The communication unit 70 is an interface unit for performing data communication with other devices via a communication line and a communication network. The memory 90 is a storage device such as a hard disk drive and a nonvolatile memory. The memory 90 stores therein inventory amount data 90*a*, coupon data 90*b*, the determination setting data 90*c*, and registration data 90*d*.

The inventory amount data 90*a* includes data about the number of the banknotes by denomination and the number of the coupons by type, which are being stored in the sheet cassettes 53 and 54, and the number of the coins by denomination, which are being stored in the coin cassettes 153 and 154. The coupon data 90*b* includes data in which are set the types of the coupons that are the target of storing in the proceeds deposit machine 100. The determination setting data 90*c* includes data in which is set information relating to the necessity of the authentication determination for the target coupons. The registration data 90*d* includes data for comparison that is used to perform the authentication determination of the target coupons. The registration data 90*d* includes data about features of the genuine coupons that are the official coupons.

The main control unit 91 is a control unit that controls the entire proceeds deposit machine 100. The main control unit 91 performs an authentication process of an operator, a control of various inputs and outputs, count of sales, management of data stored in the memory 90.

Specifically, the main control unit 91 controls the IC card reader 71 to read the identification information of the cashier or the person in charge from the cashier card, and performs the authentication process to determine whether the operator has the authority to perform the money deposit process of the proceeds from sales or collection process of taking out the deposited money.

The main control unit 91 performs the control of various inputs and outputs. The main control unit 91 performs the control of display output by the display/operation unit 73, the operation input by the display/operation unit 73, and the control of communication with other devices performed by the communication unit 70. Also, the main control unit 91 performs the control of printing by the bankbook printer 80, the control of printing of a receipt by the receipt printer 72, and transmission and reception of data to and from the sheet control unit 92 and the coin control unit 93.

The main control unit 91 calculates the proceeds from sales based on the result of the counting of the sheets obtained in the sheet processing unit and the result of the counting of the coins obtained in the coin processing unit. The result of the calculated proceeds from sales is displayed on the display/operation unit 73.

The main control unit 91 manages data stored in the memory 90. For example, the main control unit 91 updates the inventory amount data 90*a* when the deposit process and/or the dispensing process are performed by the sheet processing unit and/or the coin processing unit.

The main control unit 91 includes a determination target setting unit 91*a*, the type determination unit 91*b*, and a transmission processing unit 91*c*. As a practical matter, one or more computer programs corresponding to these functional units are stored in a ROM or a nonvolatile memory which is not shown in the figure, and a corresponding processing is performed by loading the corresponding computer program in a CPU (Central Processing Unit) and executing the computer program.

The determination target setting unit 91*a* is a processing unit that sets the coupons that are set as the target of the authentication determination. Specifically, the determination target setting unit 91*a* stores information on the types of the coupons that are the target of storing in the proceeds deposit machine 100 in the memory 90 as the coupon data 90*b*. Moreover, the determination target setting unit 91*a* stores the information relating to the necessity of the authentication determination for each of the types of the coupons that are the target of storing in the proceeds deposit machine 100 in the memory 90 as the determination setting data 90*c*. Furthermore, the determination setting unit 91*a* stores data for comparison to be used when performing the authentication determination for each of the types of the coupons that are set as the target of the authentication determination in the memory 90 as the registration data 90*d*.

New data can be added in the coupon data 90*b*, the determination setting data 90*c*, and the registration data 90*d*. The data stored in the coupon data 90*b*, the determination setting data 90*c*, and the registration data 90*d* can be updated and/or deleted as appropriate. Image data of an official coupon can be used as the data for comparison to be used for the authentication determination. Alternatively, one or more among a watermark part, a fluorescent part, a hologram, a security thread part, a microcharacter part included in the image data can be used for the authentication determination. In addition to a reflective image of visible light, a reflective image and/or a transmissive image of infrared light and/or ultraviolet light can be used as the data for comparison for the authentication determination. Furthermore, a magnetic pattern, a shape, a size, of the coupon can be used as the data for comparison for the authentication determination.

Upon receiving image data of the coupon from the sheet control unit 92, the type determination unit 91*b* determines the type of the coupon by referring to the coupon data 90*b*. Furthermore, the type determination unit 91*b* determines the necessity of the authentication determination by referring to the determination setting data 90*c* based on the determination result of the type. The type determination unit 91*b* transmits the determination result of the necessity of the authentication determination to the sheet control unit 92. Assuming that the necessity of the authentication determination is set as "yes", the type determination unit 91*b* reads the data for authentication determination of a corresponding type of the coupon from the registration data 90*d* and transmits the read data along with the information relating to the necessity of the authentication determination to the sheet control unit 92.

The transmission processing unit 91*c* transmits information relating to the data coupon (for example, image data obtained by capturing the coupon) to other devices. In the case of the data coupon, the payment request is performed based on the transmitted data. For example, the data is transmitted to a management apparatus arranged at the issuance source of the data coupon. Alternatively, the data can be transmitted to a management apparatus arranged at a place other than the issuance source of the data coupon, such as the headquarters that manages the proceeds from sales of the shop. In the later case, for example, the management apparatus arranged at the headquarters gathers information relating to the data coupons collected in several shops and performs the payment requests in a lump to the issuance source.

The transmission processing unit 91*c* can transmit the result of the authentication determination to a predetermined management apparatus. For example, by transmitting the result of the authentication determination to the management apparatus arranged in the issuance source of the coupon, or the headquarters, the actual usage of the counterfeit coupons can be grasped. By transmitting the image data of the counterfeit coupon in addition to the payment request data, the types of the counterfeit coupons, which has been used in the shop, can also be grasped.

The sheet control unit 92 controls the sheet processing unit to store the sheet. Specifically, the sheet control unit 92 performs the denomination recognition, counts the number of the banknotes, which have been received in the sheet inlet 10, by denomination, and notifies the result to the main control unit 91. If an instruction to deposit the counted banknotes is received from the main control unit 91, the banknotes are stored in the sheet cassettes 53 and 54.

The sheet control unit 92 controls the sheet recognition unit 20 to capture the coupon received in the sheet inlet 10 and transmits the captured image data to the main control unit 91. The information relating to the necessity of the authentication determination is returned from the type determination unit 91*b* of the main control unit 91. The data for authentication determination is also returned when it is necessary to perform the authentication determination.

The sheet control unit 92 includes the authentication determination unit 92*a* that performs authentication determination of the coupon by using the data for authentication determination. When it is necessary to perform the authentication determination, the authentication determination unit 92*a* determines the authentication of the deposited coupon by comparing the data of the coupon acquired by the sheet recognition unit 20 and the data for authentication determination. This determination can be performed by using a desired method. For example, a cross-correlation between both the data is calculated and the coupon can be determined as the genuine coupon when the cross-correlation exceeds a threshold value.

The sheet control unit 92 discharges the coupon, which has been determined to be the counterfeit coupon in the authentication determination, in the sheet reject unit 41. Moreover, the coupons other than the counterfeit coupons are counted and the number thereof is notified to the main control unit 91. Then, if an instruction to deposit the counted coupons is received from the main control unit 91, the coupons are stored in the sheet cassettes 53 and 54.

The coin control unit 93 controls the coin processing unit to store the coins. Specifically, the coin control unit 93 performs the recognition of the denomination, counts the number of coins, which have been received in the coin inlet 110, by denomination and notifies the result to the main control unit 91. If an instruction to deposit the counted coins is received from the main control unit 91, the coins are stored in the coin cassettes 153 and 154.

Example of Data

An example of the inventory amount data 90*a*, the coupon data 90*b*, the determination setting data 90*c*, and the registration data 90*d* shown in FIG. 4 is explained by using FIGS. 5A, 5B, 6C, and 6D. FIGS. 5A and 5B show an example of the inventory amount data 90*a* and the coupon data 90*b* shown in FIG. 4. FIGS. 6C and 6D show an example of the determination setting data 90*c* and the registration data 90*d* shown in FIG. 4.

The inventory amount data 90*a* shown in FIG. 5A is data including the number of the banknotes by denomination, the number of the coins by denomination and the number of the coupons by type, which are being stored in the sheet cassettes 53 and 54 and the coin cassettes 153 and 154, respectively. In this example, it is shown that 230 JPY 10,000-yen notes, 20 JPY 5,000-yen notes, and 40 JPY 1,000-yen notes are stored in the sheet cassettes 53 and 54. Moreover, it is shown that 10 JPY 500-yen coins, 35 JPY 100-yen coins, 20 JPY 50-yen coins, 60 JPY 10-yen coins, 15 JPY 5-yen coins, and 40 JPY 1-yen coins are stored in the coin cassettes 153 and 154. Moreover, it is shown that 20 coupons of the type “A001” and 8 coupons of the type “B001” are stored in the sheet cassettes 53 and 54.

Note that, in FIG. 5A, sheets stored in each of the sheet cassettes 53 and 54 are not managed separately; however, it can be set that an inventory amount of each of the sheet cassette 53 and the sheet cassette 54 are managed separately. Similarly, coins stored in each of the coin cassettes 153 and 154 are not managed separately; however, it can be set that an inventory amount of each of the coin cassette 153 and the coin cassette 154 are managed separately.

The coupon data 90*b* shown in FIG. 5B is data including the type of the coupon, the face value of the coupon, and the image data of surface of the coupon that are associated each other and managed by type of the coupon. In this example, it is shown that a face value “1000” and an image data “a001true.bmp” are associated with the coupon of the type “A001”. Moreover, it is shown that a face value “500” and an image data “b001true.bmp” are associated with the coupon of the type “B001”.

The determination setting data 90*c* shown in FIG. 6A is data in which the type of the coupon, the type of the payment request, and the necessity of the authentication determination are associated each other and managed by type of the coupon. In this example, it is shown that the payment request “data request” and the necessity of the authentication determination “yes” are associated with the coupon of the type “A001”. Moreover, it is shown that the payment request “physical request” and the necessity of the authentication determination “no” are associated with the coupon of the type “B001”.

The registration data 90*d* shown in FIG. 6B is data in which genuine coupon data is associated with the type of the coupon that is set as the target of the authentication determination. The genuine coupon data includes the data on the feature of the genuine coupon that is the official coupon, and this data is used as the data for comparison in the authentication determination of the coupon. In this example, it is shown that the genuine coupon data “Pattern-a001” is associated with the coupon of the type “A001”.

Process Procedure Performed by Proceeds Deposit Machine

Figure 7:
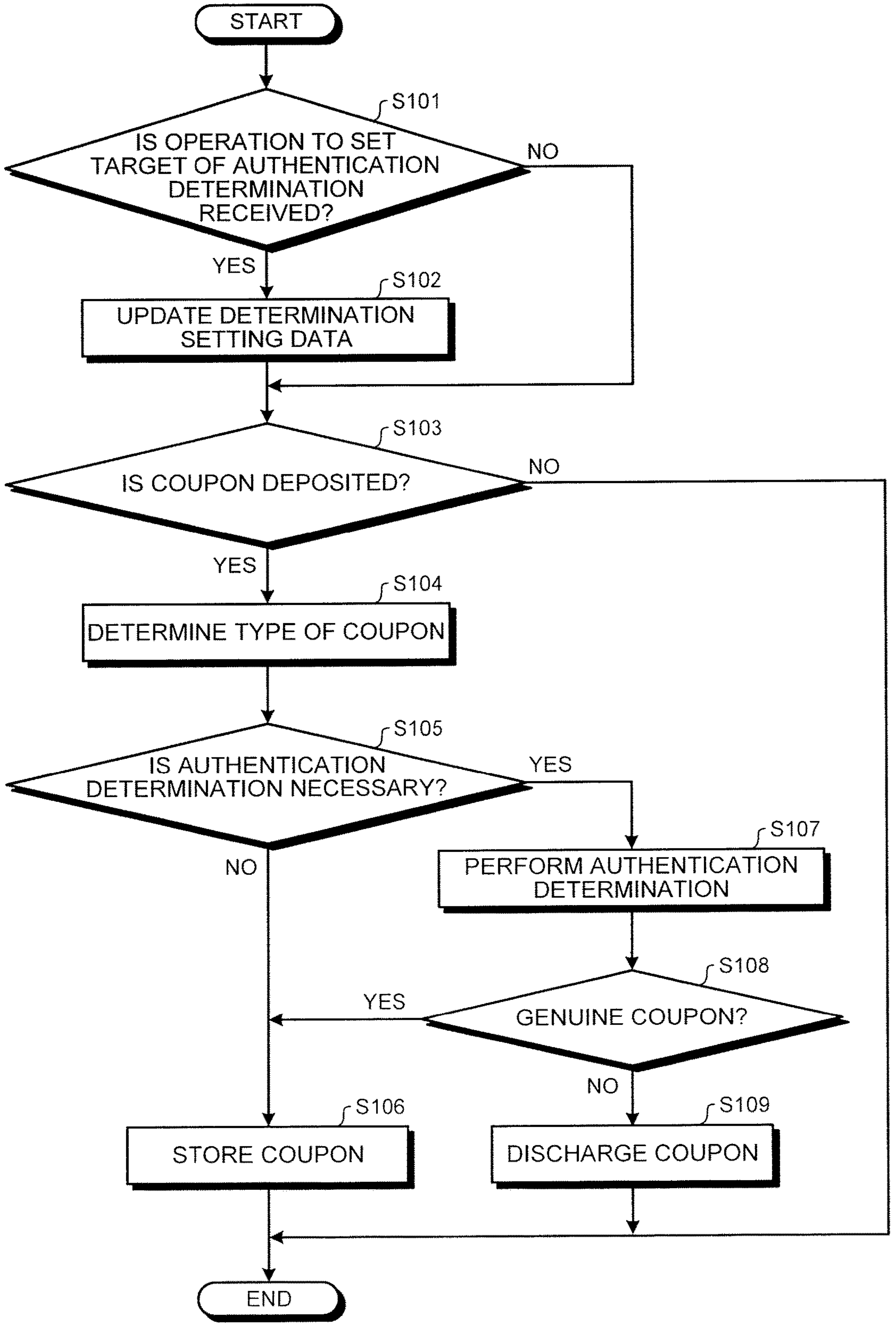
FIG. 7 is a flowchart of a process procedure relating to processing of a coupon performed by the proceeds deposit machine shown in FIG. 2.

A process procedure relating to processing of a coupon performed by the proceeds deposit machine 100 shown in FIG. 2 is explained next. FIG. 7 is a flowchart of a process procedure relating to processing of the coupon performed by the proceeds deposit machine 100 shown in FIG. 2. First, the determination target setting unit 91*a* determines whether an operation to set the target of the authentication determination is received (Step S101). If the operation to set the target of the authentication determination is received (YES: Step S101), the determination target setting unit 91*a* updates the determination setting data 90*c* based on this operation (Step S102).

After execution of Step S102, or if operation to set the target of the authentication determination is not received (NO: Step S101), the sheet control unit 92 determines whether the coupon is deposited in the sheet inlet 10 (Step S103). If the coupon is not deposited (NO: Step S103), the proceeds deposit machine 100 finishes the process relating to the coupon.

If the coupon has been deposited (YES: Step S103), the type determination unit 91*b* determines the type of the coupon based on the image data of the coupon acquired by the sheet recognition unit 20 (Step S104). Then, the type determination unit 91*b* determines the necessity of the authentication determination by referring to the determination setting data 90*c* based on the determination result of the type (Step S105).

If it is necessary to perform the authentication determination (YES: Step S105), the authentication determination unit 92*a* determines the authentication of the deposited coupon by comparing the data of the coupon acquired by the sheet recognition unit 20 and the data for authentication determination (Step S107). As a result, if it is determined that the coupon is not the genuine coupon (NO: Step S108), the sheet control unit 92 discharges the coupon in the sheet reject unit 41 (Step S109) and finishes the process relating to the coupon.

If it is determined in the authentication determination that the coupon is the genuine coupon (YES: Step S108), or it is not necessary to perform the authentication determination (NO: Step S105), the sheet control unit 92 stores the coupon (Step S106) and finishes the process.

Use of Authentication Determination Result of Coupon

Figure 8:
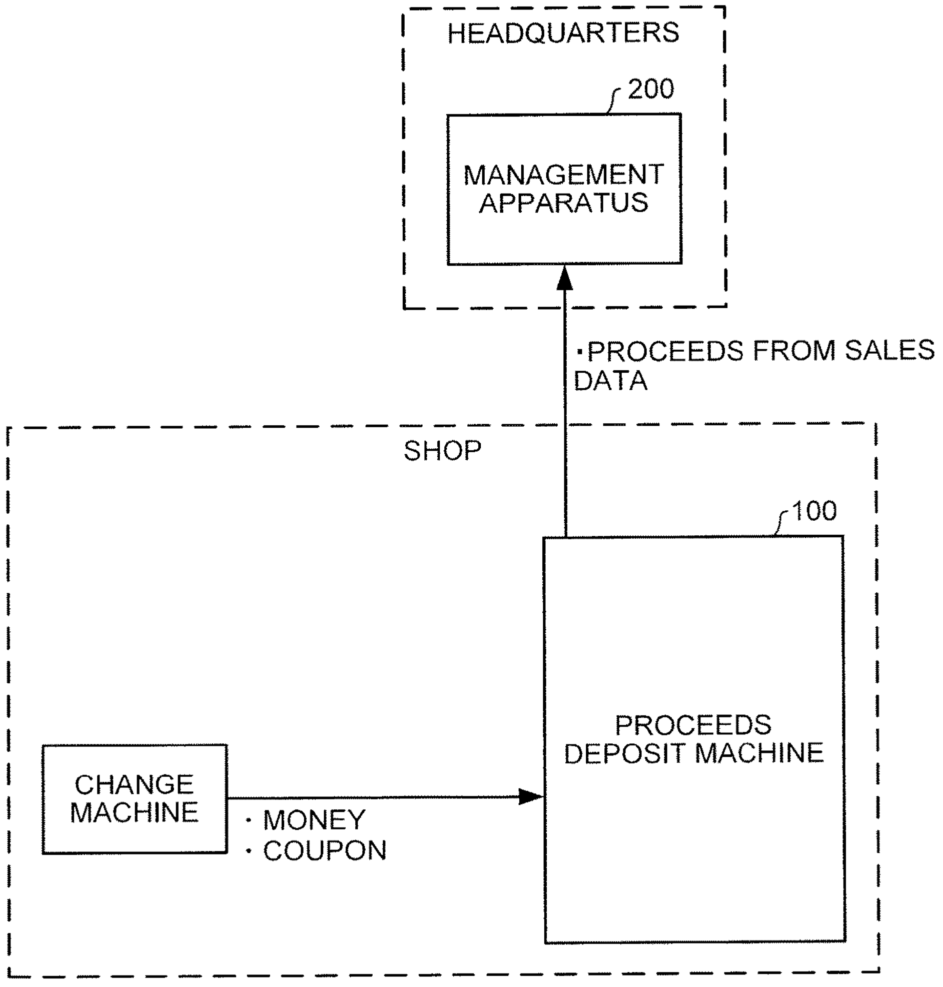
FIG. 8 is a view for explaining use of authentication determination result of the coupon.

The use of the authentication determination result of the coupon is explained next. FIG. 8 is a view for explaining the use of the authentication determination result of the coupon. As explained above, the proceeds deposit machine 100 accepts a deposit of the money and the coupon collected from the change machine arranged at the checkout counter. The proceeds deposit machine 100 counts the deposited money and the deposited coupons, and calculates the proceeds from sales. The information relating to the calculated proceeds from sales is transmitted to a management apparatus 200 of the headquarters as the proceeds from sales data.

If the counterfeit coupon, which is a coupon that has been counterfeited is simply received and the face value of the counterfeit coupon is included in the proceeds from sales, the proceeds from sales data including the face value of the counterfeit coupon is transmitted as is to the management apparatus 200. As a result, when the counterfeit coupon is found, the impairment processing for the counterfeit coupon needs to be performed by cooperation between the headquarters and the shop. It leads to a heavy workload.

To address this issue, the proceeds deposit machine 100 selectively subjects the coupon of the previously set type to the authentication determination, and the coupon is discharged if it is the counterfeit coupon. With such a configuration, the impairment processing of the counterfeit coupon can be performed in the shop and therefore, it is possible to avoid inclusion of the face value of the counterfeit coupon in the proceeds from sales data. Accordingly, the workload can be reduced.

As explained above, in the proceeds deposit machine 100 that is the banknote handling apparatus according to the first embodiment, the type of the coupon that is set as the target of the authentication determination and the type of the coupon that is not set as the target of the authentication determination are set previously. Among the coupons deposited into the sheet inlet 10, the authentication determination process is performed for the coupons of the types that are set as the target of the authentication determination. Accordingly, the authentication determination of the sheet can be performed efficiently.

Second Embodiment

In the first embodiment, an example has been explained in which the proceeds deposit machine 100, which is the sheet handling apparatus, performs the authentication determination of the coupons; however, the present invention is not limited to this configuration. A sheet handling system can be configured in which the proceeds deposit machine accepts a deposit of the coupon and the authentication determination of the coupon is performed by another device. In a second embodiment, an example is explained in which the receiving of the coupon and the authentication determination thereof are performed by different devices. Note that, same reference numbers will be attached to the structural elements that are the same as those in the first embodiment and the detailed explanation thereof will be omitted.

Figure 9:
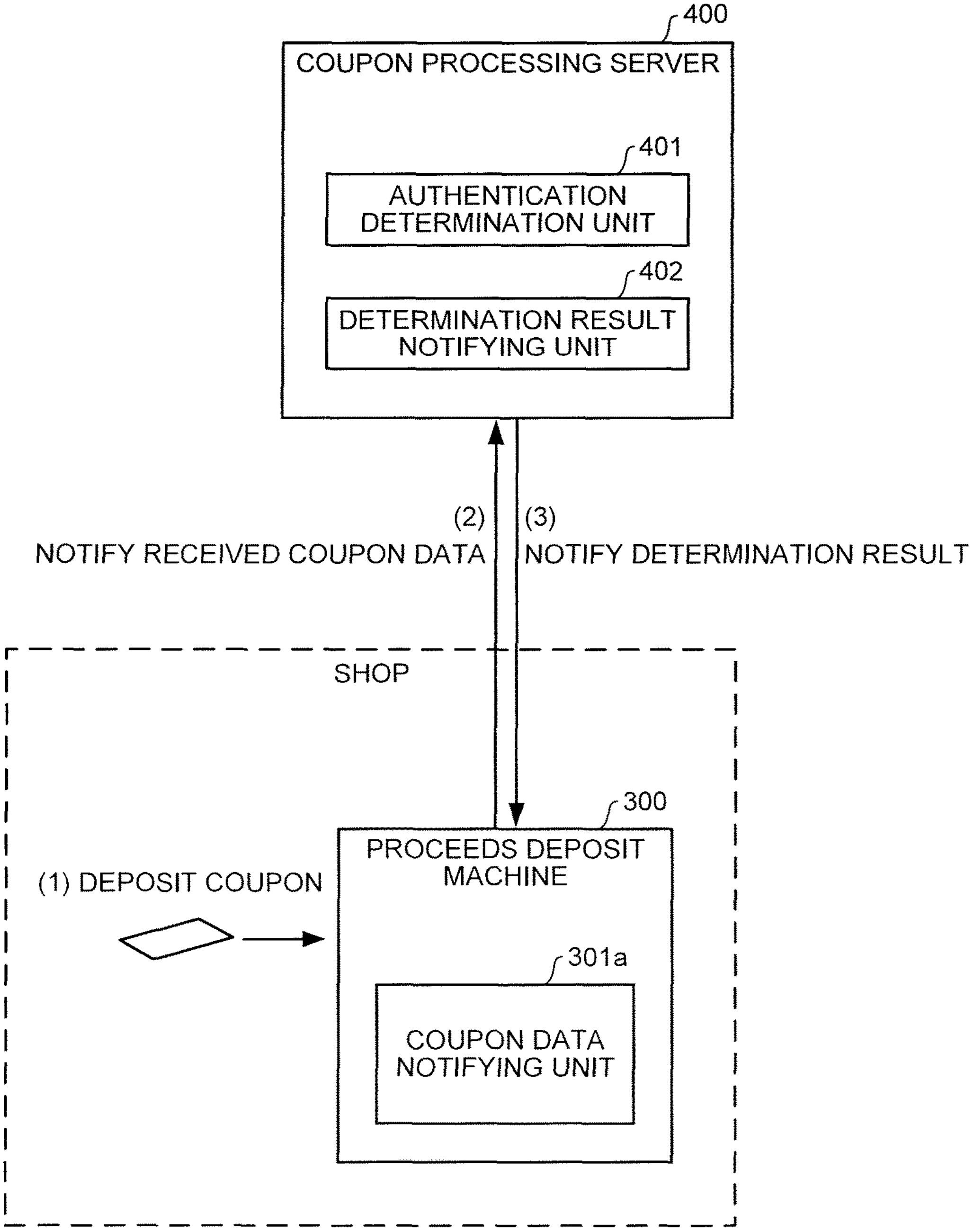
FIG. 9 is a view to explain the concept of a sheet handling system according to a second embodiment.

First, the concept of a sheet handling system according to the second embodiment is explained. FIG. 9 is a view to explain the concept of the sheet handling system according to the second embodiment. In the sheet handling system shown in FIG. 9, a proceeds deposit machine 300 and a coupon processing server 400 are connected to each other. The proceeds deposit machine 300 is a sheet handling apparatus installed in a back office of a shop. The coupon processing server 400 is installed outside of the shop, e.g., at the headquarters, a certain data management center.

Upon accepting the deposit of a coupon, the proceeds deposit machine 300 determines the type of the coupon (Step 1), like the proceeds deposit machine 100 according to the first embodiment, and determines the necessity of the authentication determination. The proceeds deposit machine 300 includes a coupon data notifying unit 301*a*. When it is necessary to perform the authentication determination of the received coupon, the coupon data notifying unit 301*a* notifies the coupon processing server 400 of received coupon data relating to the received coupon (Step 2).

The coupon processing server 400 includes an authentication determination unit 401 and a determination result notifying unit 402. The authentication determination unit 401 has data for authentication determination for each type of the coupon and performs the authentication determination by using the data for authentication determination corresponding to the received coupon data received from the proceeds deposit machine 300.

The determination result notifying unit 402 notifies the proceeds deposit machine 300 of the determination result obtained by the authentication determination unit 401 (Step 3).

The proceeds deposit machine 300 processes the deposited coupon based on the determination result received from the coupon processing server 400. Specifically, if the received determination result shows that the deposited coupon is the counterfeit coupon, the proceeds deposit machine 300 discharges the deposited coupon. If the received determination result shows that the deposited coupon is the genuine coupon, the proceeds deposit machine 300 stores the deposited coupon inside the machine. When the proceeds deposit machine 300 determines that it is not necessary to perform the authentication determination of the deposited coupon, the proceeds deposit machine 300 stores the deposited coupon without notifying the coupon processing server 400 of the received coupon data.

In this manner, the proceeds deposit machine 300 notifies the coupon processing server 400 of the received coupon data relating to the coupon of the type that has been set as the target of the authentication determination among the deposited coupons. The coupon processing server 400 performs the authentication determination of the deposited coupon based on the received coupon data and notifies the proceeds deposit machine 300 of the determination result. Accordingly, authentication determination of the coupon can be performed efficiently, the counterfeit coupon can be found at an early stage, and countermeasures and impairment processing can be performed.

When the coupon processing server 400 determines in the authentication determination that the coupon is the counterfeit coupon, it is possible to configure to notify another device of the information relating to the counterfeit coupon. This is because, by sharing the information relating to the counterfeit coupons, it is possible to contribute to the improvement of the precision of the authentication determination and the grasp of the actual circulation of the counterfeit coupons.

Figure 10:
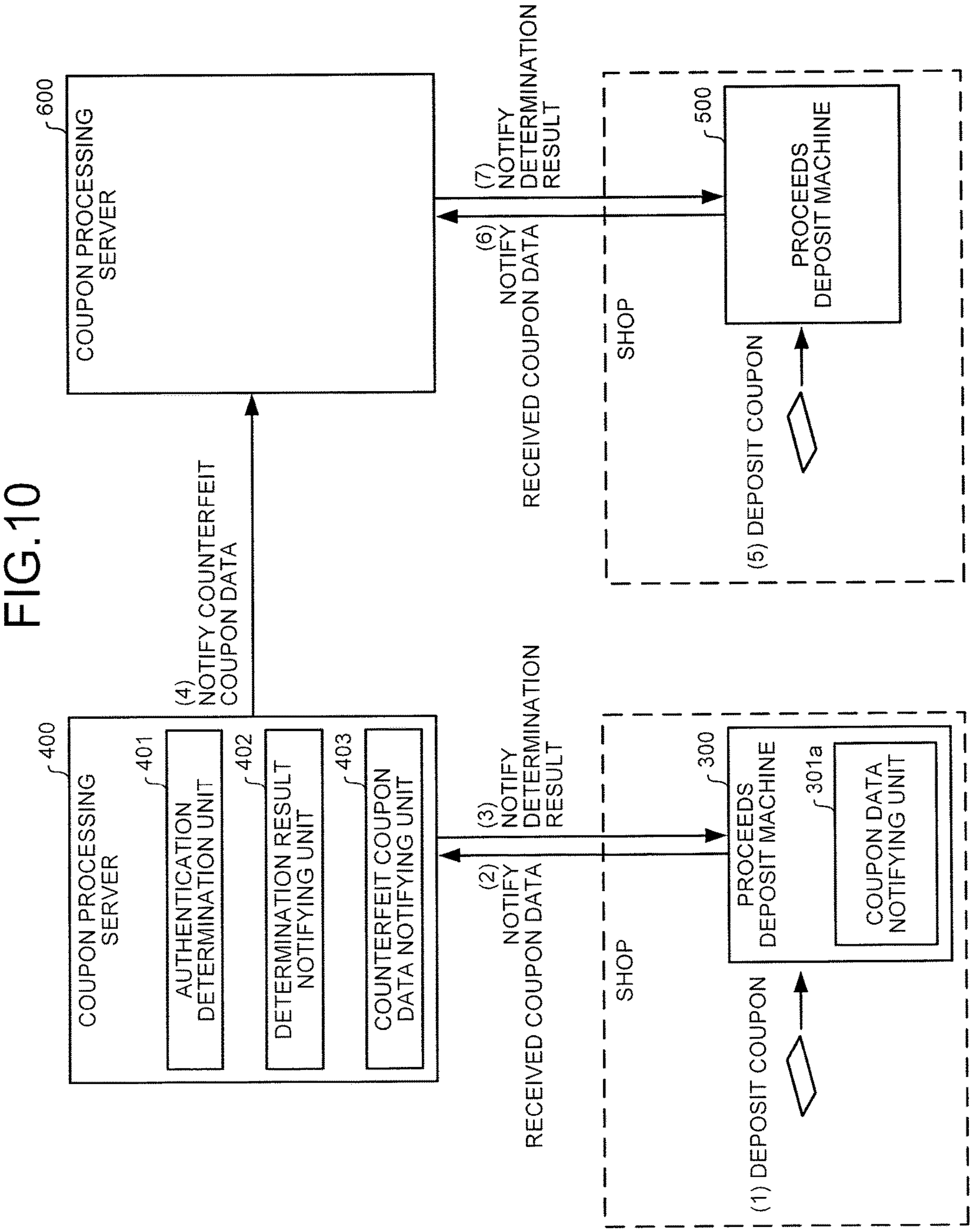
FIG. 10 is a view for explaining information sharing relating to the counterfeit coupons.

FIG. 10 is a view for explaining information sharing relating to the counterfeit coupons. In FIG. 10, the coupon processing server 400 that is connected in a communicable manner to the proceeds deposit machine 300 includes a counterfeit coupon data notifying unit 403 in addition to the authentication determination unit 401 and the determination result notifying unit 402. Moreover, a proceeds deposit machine 500 having the same configuration as the proceeds deposit machine 300 is installed in a shop different from the shop in which the proceeds deposit machine 300 has been installed. The proceeds deposit machine 500 is connected in a communicable manner to a coupon processing server 600 having the same configuration as the coupon processing server 400. Furthermore, the coupon processing server 400 and the coupon processing server 600 are connected in a communicable manner.

Like in FIG. 9, when a coupon of the type that is set as the target of the authentication determination is deposited into the proceeds deposit machine 300 (Step 1), the coupon data notifying unit 301*a* transmits a received coupon data to the coupon processing server 400 (Step 2). In the coupon processing server 400, the authentication determination unit 401 performs the authentication determination and the determination result notifying unit 402 transmits a determination result to the proceeds deposit machine 300 (Step 3).

When the authentication determination unit 401 determines in the authentication determination that the coupon is the counterfeit coupon, the counterfeit coupon data notifying unit 403 transmits the received coupon data of the counterfeit coupon, as counterfeit coupon data, to the coupon processing server 600.

The coupon processing server 600 that received the counterfeit coupon data reflects the counterfeit coupon data for the subsequent authentication determination. Specifically, the coupon processing server 600 updates the registration data to be used for the authentication determination thereby improving the precision of the authentication determination.

Therefore, when a coupon of the type that is set as the target of the authentication determination is deposited into the proceeds deposit machine 500 (Step 5) and the coupon data is transmitted to the coupon processing server 600 (Step 6), the coupon processing server 600 can accurately perform the authentication determination by using the updated registration data and transmit the determination result (Step 7).

Figure 11:
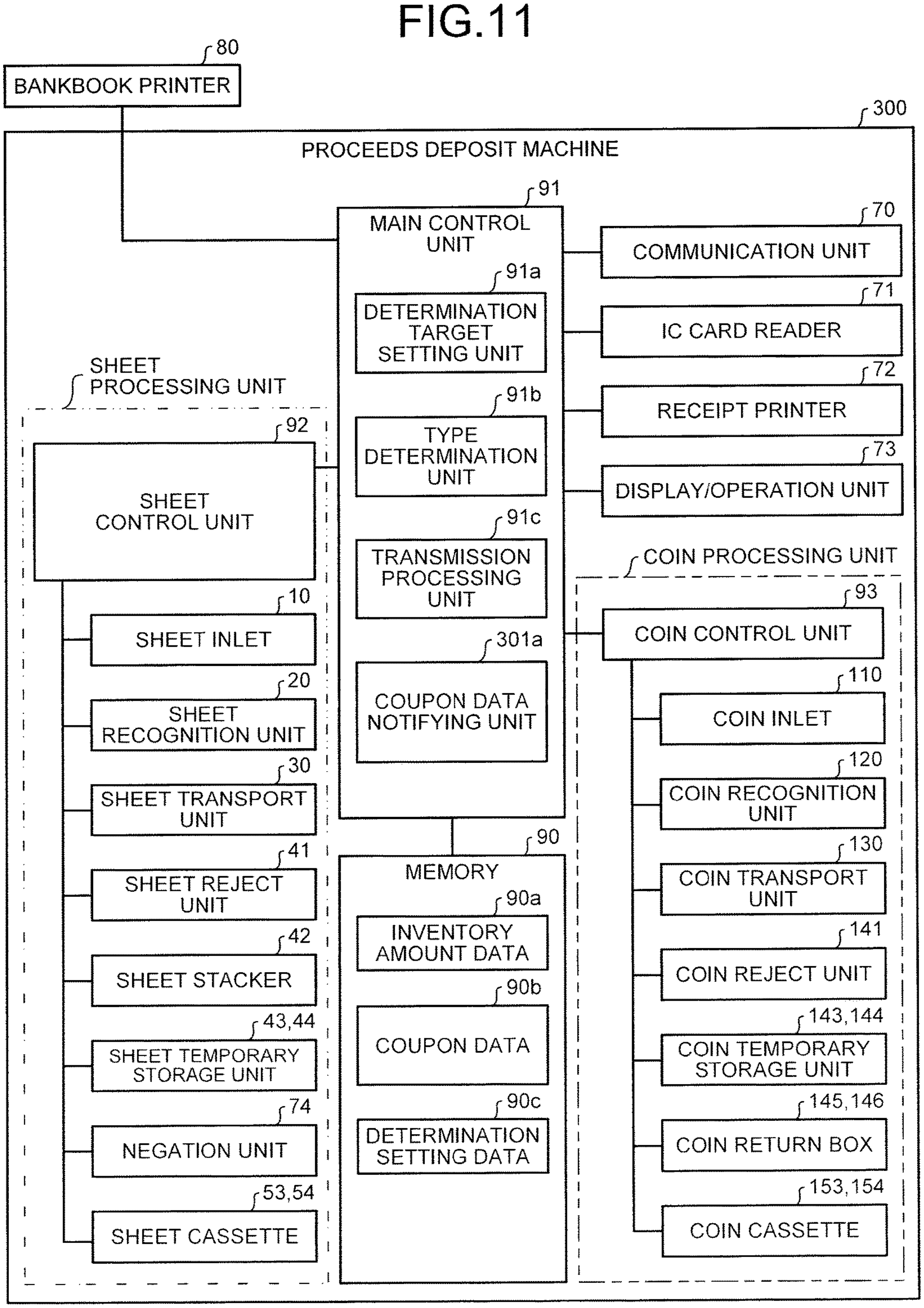
FIG. 11 is a functional block diagram of a proceeds deposit machine.

An internal functional configuration of the proceeds deposit machine 300 shown in FIG. 9 is explained next. FIG. 11 is a functional block diagram of the proceeds deposit machine 300. The sheet control unit 92 of the proceeds deposit machine 300 does not include the authentication determination unit 92*a* and the registration data 90*d* is not stored in the memory 90. Moreover, the coupon data notifying unit 301*a* is arranged in the main control unit 91.

In the proceeds deposit machine 300, upon receiving the image data of the coupon from the sheet control unit 92, the type determination unit 91*b* determines the type of the coupon by referring to the coupon data 90*b*. Furthermore, the type determination unit 91*b* determines the necessity of the authentication determination by referring to the determination setting data 90*c* based on the determination result of the type. If the necessity of the authentication determination is "no", the type determination unit 91*b* notifies the sheet control unit 92 of this fact. If the necessity of the authentication determination is "yes", the type determination unit 91*b* requests the coupon data notifying unit 301*a* to transmit the received coupon data, and the type determination unit 91*b* notifies the sheet control unit 92 of the determination result received from the coupon processing server 400.

Therefore, the sheet control unit 92 performs the discharging of the counterfeit coupon and the storing of the coupon other than the counterfeit coupon based on the notice from the type determination unit 91*b*.

The other configuration and functions are the same as those of the proceeds deposit machine 100 shown in FIG. 4, the same reference numbers are used to refer to the same structural components, and explanation thereof will be omitted.

As explained above, in the second embodiment, the sheet handling system is configured by connecting the proceeds deposit machine 300 which is the banknote handling apparatus, and the coupon processing server 400 which is the management apparatus. The proceeds deposit machine 300 notifies the coupon processing server 400 of the received coupon data relating to the coupon of the type that has been set as the target of the authentication determination among the deposited coupons, and the coupon processing server 400 performs the authentication determination of the coupon based on the received coupon data and notifies the proceeds deposit machine 300 of the determination result. Accordingly, the authentication determination of the coupon can be performed efficiently.

Moreover, the coupon processing server 400 notifies the other device of the information relating to the counterfeit coupon. Accordingly, it is possible to contribute to the improvement of the precision of authentication determination and the grasp of the actual circulation of the counterfeit coupon.

Variation

A variation of the processing of the counterfeit coupon is explained below. The first embodiment and the second embodiment show an example in which the coupon that has been determined to be the counterfeit coupon is discharged as it is from the sheet reject unit 41. Alternatively, the counterfeit coupon can be stored in a storing unit different from the storing unit in which the genuine coupon is stored.

For example, if the counterfeit coupon is to be stored in the sheet cassette 53 and the genuine coupon is to be stored in the sheet cassette 54, the coupon determined to be the counterfeit coupon by the sheet recognition unit 20 is transported to the sheet temporary storage unit 43 and the coupon determined to be the genuine coupon by the sheet recognition unit 20 is transported to the sheet temporary storage unit 44. Then, based on a predetermined confirmation operation, the counterfeit coupon is transported from the sheet temporary storage unit 43 to the sheet cassette 53 and the genuine coupon is transported from the sheet temporary storage unit 44 to the sheet cassette 54.

When taking the counterfeit coupon inside the device, it may be preferable to display this fact on the display/operation unit 73. When doing so, the image data of the counterfeit coupon obtained by the sheet recognition unit 20 may be displayed simultaneously.

Furthermore, it can be set that approval from a custodian (e.g., manager) having a certain authority is acquired when transporting the counterfeit coupon from the sheet temporary storage unit 43 to the sheet cassette 53. Specifically, when the predetermined confirmation operation corresponding to the transport of the sheet from the sheet temporary storage units 43 and 44 to the sheet cassettes 53 and 54 is performed, it is determined whether the counterfeit coupon has been stored in the sheet temporary storage unit 43. If the counterfeit coupon has been stored, a message that requests approval of the custodian is displayed on the display/operation unit 73. Thereafter, if an IC card of the custodian having the necessary authority is read by the IC card reader 71 and an approval operation is performed, the transport of the sheets from the sheet temporary storage units 43 and 44 to the sheet cassettes 53 and 54 is performed. Moreover, it can be set that the counterfeit coupon stored in the sheet temporary storage unit 43 can be returned subject to the approval of the custodians.

When taking the counterfeit coupon in the device, the image data of the counterfeit coupon captured by the sheet recognition unit 20 can be transmitted to a terminal of the custodian and an approval can be requested. In this case, the custodian can check the image data of the counterfeit coupon displayed on his terminal while he may be away from the proceeds deposit machine 100 or 300 and can perform the approval operation from a remote place. When the approval operation is performed on the terminal of the custodian, the proceeds deposit machine 100 or 300 is notified of the fact that the approval operation has been performed, and the proceeds deposit machine 100 or 300 can perform the storing in the sheet cassette 53 or the returning of the counterfeit coupon.

How the sheets should be stored in the sheet stacker 42, the sheet cassette 53, and the sheet cassette 54 can be set appropriately. For example, the banknotes and the coupons are stored in a mixed state in the sheet cassette 53 and the sheet cassette 54. Alternatively, the sheet cassette 53 can be assigned to the banknotes, and the sheet cassette 54 can be assigned to the coupons. Moreover, the data coupon can be stored in the sheet stacker 42.

For example, the counterfeit coupon is discharged and discarded. Alternatively, the physical counterfeit coupon is delivered to a certain delivery destination such as the cash center, the headquarters, and the issuance source of the coupon. Moreover, the data relating to the counterfeit coupon is transmitted to a desired destination.

In the above-explained embodiments, the genuine data coupons are stored in the sheet cassettes 53 and 54; however, the genuine data coupons can be discharged in the sheet reject unit 41, or can be stored in the sheet stacker 42 to be collected in the shop. This is because the actual data coupon is not required at the time of the payment request.

Moreover, in the first embodiment, the authentication determination unit 92*a* is provided in the sheet control unit 92, and the authentication determination is performed in the sheet processing unit; however, the authentication determination can be performed in the main control unit 91. Moreover, in the first embodiment and the second embodiment, the type of the coupon is determined in the main control unit 91; however, it is allowable to perform the determination of the type of the coupon in the sheet processing unit or the coupon processing server 400.

Moreover, in the first embodiment and the second embodiment, the type of the coupon that is set as the target of the authentication determination and the type of the coupon that is not set as the target of the authentication determination are set; however, the present invention can apply to a desired sheet and not only to the coupon. For example, if a sheet handling apparatus can accept a deposit of money of two countries, the money of one country is set as the target of the authentication determination and the money of the other country is not set as the target of the authentication determination. Moreover, not only for the authentication determination but also for another determination, it can be set whether to set that determination as the target.

Moreover, in the first embodiment and the second embodiment, the present invention is applied to the proceeds deposit machine, which is installed in the back office of the shop, that accepts deposit of the proceeds from sales from several checkout counters installed in the shop; however, the present invention can be applied to the change machine installed at the checkout counter. In this case, the authentication determination can be performed at the instant the money and/or the coupon received as the price of a transaction is deposited into the change machine. Accordingly, completion of a dishonest transaction by using the counterfeit coupon can be prevented.

The various structural components mentioned in the above embodiments are functional and are not necessarily present physically. That is, decentralization and/or unification of various components are not limited to that shown in the drawings. All of or some of the components can be decentralized and/or unified in desired units, functionally or physically, depending on various load, operating conditions.

INDUSTRIAL APPLICABILITY

As explained above, the sheet handling apparatus, the sheet handling system, and the sheet handling method according to the present invention are suitable for efficiently performing the authentication determination of the sheet.

EXPLANATION OF REFERENCE NUMERALS

10 Sheet inlet
20 Sheet recognition unit
30 Sheet transport unit
41 Sheet reject unit
42 Sheet stacker
43, 44 Sheet temporary storage unit
53, 54 Sheet cassette
70 Communication unit
71 IC card reader
72 Receipt printer
73 Display/operation unit
74 Negation unit
80 Bankbook printer
90 Memory
90*a* Inventory amount data
90*b* Coupon data
90*c* Determination setting data
90*d* Registration data
91 Main control unit
91*a* Determination target setting unit
91*b* Type determination unit
91*c* Transmission processing unit
92 Sheet control unit
92*a* Authentication determination unit
93 Coin control unit
100, 300, 500 Proceeds deposit machine

101 Upper unit
102 Lower unit
110 Coin inlet
120 Coin recognition unit
130 Coin transport unit
141 Coin reject unit
143, 144 Coin temporary storage unit
145, 146 Coin return box
153, 154 Coin cassette
200 Management apparatus
301*a* Coupon data notifying unit
400, 600 Coupon processing server
401 Authentication determination unit
402 Determination result notifying unit
403 Counterfeit coupon data notifying unit

The invention claimed is:

1. A sheet handling apparatus comprising:

an inlet configured to deposit a sheet;

a setting unit configured to set whether the sheet is to be a target of determination including at least authentication determination; and a determination unit configured to perform at least the authentication determination of the sheet, which has been set by the setting unit as the target of the determination, among sheets deposited in the inlet.

2. The sheet handling apparatus as claimed in claim 1, further comprising an image capturing unit configured to capture the sheet; and a transmission processing unit configured to transmit image data of the sheet of a predetermined type, which is captured by the image capturing unit among the sheets deposited in the inlet, to a predetermined management apparatus corresponding to the sheet, wherein the setting unit is configured to set the sheet of the predetermined type, of which the image data is transmitted to the management apparatus, as the target of the determination, and set the sheet of a type other than the predetermined type not as the target of the determination.

3. The sheet handling apparatus as claimed in claim 2, further comprising a memory configured to store therein, as registration data, the image data of an official sheet set as the target of the determination by the setting unit, or data relating to at least one of a watermark part, a fluorescent part, a hologram, a security thread part, and a microcharacter part included in the image data, wherein the determination unit is configured to perform the authentication determination of the sheet set as the target of the determination by the setting unit based on the registration data stored in the memory, and the image data of the sheet of the predetermined type that has been captured by the image capturing unit, or at least one of the watermark part, the fluorescent part, the hologram, the security thread part, and the microcharacter part included in the image data.

4. The sheet handling apparatus as claimed in claim 2, wherein the transmission processing unit is configured to transmit to the predetermined management apparatus corresponding to the sheet determination result of the sheet obtained by the determination unit along with the image data of the sheet of the predetermined type.

5. The sheet handling apparatus as claimed in claim 1, wherein the sheet is a coupon that is used for payment for merchandise, and the setting unit is configured to set a coupon, of which data need to be transmitted to an issuance source, as the target of the determination, and set a coupon, for which the coupon needs to be physically sent to the issuance source, not as the target of the determination.

6. The sheet handling apparatus as claimed in claim 1, wherein the sheet is money, and the setting unit is configured to set money issued by a first country as the target of the determination and set money issued by a second country not as the target of the determination.

7. A sheet handling system in which a sheet handling apparatus and a predetermined management apparatus are connected to each other, wherein the sheet handling apparatus includes an inlet configured to deposit a sheet;

a setting unit configured to set whether the sheet is to be a target of determination including at least authentication determination; and a sheet data notifying unit configured to notify the management apparatus of data relating to the sheet set as the target of the determination by the setting unit, among sheets deposited in the inlet, and the management apparatus includes a determination unit configured to perform at least the authentication determination of the sheet based on the data relating to the sheet notified by the sheet handling apparatus; and a determination result notifying unit configured to notify the sheet handling apparatus of determination result obtained by the determination unit.

8. The sheet handling system as claimed in claim 7, wherein the management apparatus further includes a counterfeit information notifying unit configured to notify, when the determination unit determines that the sheet is counterfeit, the management apparatus of each shop of information relating to the sheet.

9. A sheet handling method implemented in a sheet handling apparatus that includes an inlet configured to deposit a sheet, the sheet handling method comprising:

setting whether a sheet is to be a target of determination including at least authentication determination; and performing at least the authentication determination of the sheet set as the target of the determination at the setting, among the sheets deposited in the inlet.

* * * * *